(12) United States Patent
Sharma

(10) Patent No.: US 11,921,882 B2
(45) Date of Patent: Mar. 5, 2024

(54) SAFECASE PROCESS

(71) Applicant: Gaurav Sharma, New Delhi (IN)

(72) Inventor: Gaurav Sharma, New Delhi (IN)

(73) Assignee: CertiSafe Private Limited, Delhi (IN)

( * ) Notice: Subject to any disclaimer, the term of this patent is extended or adjusted under 35 U.S.C. 154(b) by 438 days.

(21) Appl. No.: 16/755,451

(22) PCT Filed: Oct. 10, 2018

(86) PCT No.: PCT/IB2018/057842
§ 371 (c)(1),
(2) Date: Apr. 10, 2020

(87) PCT Pub. No.: WO2019/073400
PCT Pub. Date: Apr. 18, 2019

(65) Prior Publication Data
US 2020/0265161 A1      Aug. 20, 2020

(30) Foreign Application Priority Data

Oct. 10, 2017   (IN) .............................. 201711035863

(51) Int. Cl.
*G06F 21/62*       (2013.01)
*G06F 21/31*       (2013.01)
*G06Q 40/08*       (2012.01)

(52) U.S. Cl.
CPC .......... *G06F 21/6245* (2013.01); *G06F 21/31* (2013.01); *G06Q 40/08* (2013.01)

(58) Field of Classification Search
CPC ..... G06F 21/6245; G06F 21/31; G06Q 40/08; G06Q 30/0185; G06Q 10/10
USPC ........................................................ 727/26
See application file for complete search history.

(56) References Cited

U.S. PATENT DOCUMENTS

2015/0074757 A1*   3/2015   Sharma .................. G06F 21/45
726/2

OTHER PUBLICATIONS

International search report for priority application PCT/IB2018/057842, dated Sep. 1, 2018.
ISA Written Opinion for priority application PCT/IB2018/057842, dated Sep. 1, 2018.

* cited by examiner

*Primary Examiner* — Jeffrey C Pwu
*Assistant Examiner* — Nega Woldemariam
(74) *Attorney, Agent, or Firm* — Heslin Rothenberg Farley & Mesiti PC; Rachel L. Pearlman, Esq.

(57) ABSTRACT

Described is a secure, electronic, submission process providing and enabling applicants to initiate requests to desirous requestors seeking such submissions based on authenticated and trusted identities and/or credentials or which could be authenticated securely through other defined processes. SafeCase is an innovative process for convenience, ease and security in application submissions for anyone and everyone through an electronic interface that has been built innovatively on the strong foundations of Identity Management, giving irrevocable and irrefutable trust on the Identity and/or credentials and/or the purpose that an applicant is applying for or wishes to achieve. SafeCase is an end-to-end secure and transparent interface, wherein the applicant (i.e. the Candidate) utilizes his/her Authenticated Credential(s) or Identity(ies) to submit an application. The applicant remains updated in real time on the status of the submitted application till its final disposal. On the other hand, the Requestor securely receives the said application and gets further updated if and when there is any change to the said submitted identity or credentials thereof.

12 Claims, No Drawings

SAFECASE PROCESS

FIELD OF INVENTION

SafeCase's innovative, user defined-driven-owned process is an electronic system having the ability to securely process application submissions in real time. Such applications could be for example, but certainly not limited to, academic or financial or services or insurance or personal or legal or statutory etc.

BACKGROUND OF INVENTION WITH REGARD TO DRAWBACKS ASSOCIATED WITH KNOWN ART

It is no surprise that every time an applicant has to submit an application—be it for an admission or a job opening or a bank related purpose or any such process where an application (physical form or electronic form based or even without any form) is involved, the applicant undergoes the regular process of filling up the form and then attaching copies of credentials that may or may not be needed to be verified/notarized/attested, and then submitting the bunch. In return the applicant may or may not get the privilege of getting a receipt such as a counterfoil/applicant copy/receipt letter etc. This is the most used method due to multiple reasons such as illiteracy/comfort etc on physical process due to legacy/inaccessibility of electronic means when needed etc. All This often leads to corruption, dissatisfaction, inconsistencies, well known social issues etc Additionally, depending on the process maturity levels or responsibility levels of receiving Requestors, there always remains a huge identity security risk since what happens to these applications does not always become known. Failure to duly safeguard these applications and Identity defining Credentials are opportunities of Identity-theft, identity-fraud while poor perusal of such applications is an opportunity for Identity deception. Further, identity-deception obviously go undetected if the Identity is not viewed as a whole.

In some cases, where electronic filling is possible or preferred, the applicant may be required to submit application form electronically by means of an online form or a locally generated xml file that ultimately populates the data fields of the same electronic application form. Further, some processes make it convenient for applicants to upload their electronic Credentials/copies to support their application. These electronic Credentials/copies may or may not be true (Authenticated). Hence, the onus of relying/not relying or the onus of getting such Credentials Verified/Authenticated as provided by the applicant, lies with the recipient of such applications.

Online Credential Storage Solutions are merely data storage solutions and may not be holding truly Authenticated credentials or which can be Authenticated later. Self-digitally-signed-attested electronic copies trusted on their face value, become a real threat since such copies invariably add to an Identity and could get referred or used at a later stage citing genuineness based on 'true-at-that-time'.

Additionally, some solutions are mere aggregators of information. Claims that their modus operandi is collecting 'actual' Credentials from the 'actual' Issuers as and when required by the applicant by means of providing a 'pull' link to applicants through which an electronic command is sent to the said Issuer to provide the Credential electronically, is thoroughly perforated with imperfections since the entire transport layer can never be guaranteed. This is because such models have the intrinsic risk of repudiating genuine credentials and hence there can never be a guarantee for the same Use of cost ineffective Digital Signatures is another supposed solution for such application submissions, but that too is neither an efficient mechanism even after decades of existence and strong advocacy, nor an absolutely authentic method in today's highly digital world due to rise in possibilities of frauds through illiteracy, proxy, theft, coercion, consideration etc Review and retrieval of application forms is offered by some electronic processes to applicants, obviously for only those which are theirs and available (not archived) and of these, the ones that the applicant has actually used/submitted. It has no relation or bearing to any other form or service provider etc. It is common knowledge that such time bound storage range from a few days to a few months, post which it is impossible for the applicant to retrieve any such form or application as a whole, let alone use it elsewhere Even when done electronically, with any of the existing electronic processes, there is neither an element of absolute and irrevocable trust to the recipient on such applications nor an element of convenience or certainty to the applicant. It is also important to note here that the 'electronic' processes as defined above usually culminate in getting printed and stored as records for future references. This effectively renders useless, the entire effort of such electronic process transactions In the existing electronic submission processes, Privacy Control, the most critical aspect is conveniently and completely ignored by any and all such processes. Identity or Credential Owners have no clue on the final disposal of their application as well as the Credentials. Subsequent use, misuse, unauthorized use, use as anonymized data etc are known perils that unfortunately get ignored in the absence of credible secure solutions Primary reason for such processes being user un-friendly is that they are completely Requestor-driven and never the Candidates, the actual owner of a True Identity. This is what SafeCase changes completely by providing a Candidate-Initiated-Owned-Driven application submission process, which has never existed before and provides just perfect privacy controls, which, if available are in negligible systems and with too less controls

OBJECT OF INVENTION

SafeCase invention is to make available a secure, referenceable, trusted application submission platform accommodating user convenience and privacy controls as well as being useful for receivers of such submission transactions utilizing trusted and/or authenticated identities and/or credentials

STATEMENT OF INVENTION

An electronic Candidate-initiated-owned-driven secure application submission platform which generates a secure unique ID (SafeCase ID or SCID) for each application submission transaction which a Candidate could undertake on the platform and be able to refer or retrieve any such application at a later and/or up to defined period of time and which uses authenticated identities or authenticated credentials or such identities and credentials which could be self-certified currently (though not preferred, but optional), but, authenticated in future, thus giving irrefutable trust to transactions being carried out as well as for future transactions based on such historical transactions, invariably becoming equally useful and trusted by receivers who may have mandated such applications or forms specifically or generally or are receiving said applications or forms or details through voluntary actions of Candidates

SUMMARY OF INVENTION

SafeCase is unique ID (SafeCase ID or SCID) which gets generated on successful submission of set of details and/or Credentials and/or Identities or all collectively for an electronic Candidate-initiated-owned-driven secure application submission in the SafeCase platform. This SafeCase ID would be unique irrespective of the genesis purpose of the submission as chosen by the Candidate. Each such SafeCase platform generated ID could be the result of any of the following (but not limited to these only):
  SafeCase Basic
  SafeSubmit
  SafeKYC
  SafeResume
  SafeKnot
  SafeSuccession
  SafePort
  SafeDND
  SafeAdmit
  SafeDonor Personal
  SafeDonor Charities
  SafeWarranty
  DisasterSafe
  SafeCast
  SafeClaim Insurance
  SafeClaim Employee
  SafeHire
  SafeRx
  SafeChain One SCID would never get generated for more than one SafeCase, however, newly initiated SafeCases could refer to SCIDs already generated and shall undergo the same Privacy processes as chosen by the Candidate.

DETAILED DESCRIPTION

SafeCase Process is a closed ended secure eco-system comprises of three actors, each of whom registers and chooses the suitable role, on the SafeCase system or purpose-based SafeCase Systems for submissions as mentioned in [74] or CertiSafe Identity Management & Privacy Control System or similar Trusted Identity Based Systems and could be an Individual or a Group or an Organization—Government/Semi-Government/Non-Government or Body Corporate etc and are named and explained below for clarity:

A Candidate, who wishes to use his/her Identity and/or Credentials in creating a request for submission A Requestor, who would receive the said submission from the said Candidate and could have mandated a specific form(s) to be filled as submission acceptance criteria or without any such form(s) or may also receive a general submission without any specific purpose An Issuer, who would be the only entity who is the single source of truth to Authenticate a said Credential or an Identity that the Candidate intends to use in his/her submission; and is also the sole authority to effect any post—Authentication changes such as suspension or revocation or invalidation (due to date and/or any reason) and then if any reinstatement needs to be executed Specific purposes, actions, privileges of the above Roles/Actors have been detailed in as steps in Common Processes ([45]) and Separate Process ([74]) in the disclosures that follow SafeCase is a virtual electronic briefcase for purposes as may be available in SafeCase Process and System, having a Unique ID generated only on successful submission to the Requestor, holding the Application Form (if any), Credentials (if any), Privacy Controls (if any) and other settings (if any) for the said application and is initiated and created by the Candidate and Candidate alone.

The Candidate has the privilege, convenience and freedom to append the said SafeCase with the required Credentials or Forms or Settings or Privacy requirements for a SafeCase Application. This process of modifying or appending the SafeCase is allowed only till the time it has not been submitted by the Candidate to a Requestor.

Each SafeCase remains in independent existence of other SafeCases, yet each SafeCase is able to include a previously submitted SafeCase in any new submission initiated by the Candidate. Each such previously submitted SafeCase may or may not be previously submitted to the same Requestor More than one SafeCase can be submitted by a single Candidate to a single Requestor and the Requestor can receive more than one SafeCase from a single or ultiple Candidate (s)

Requestors, who may have received physical forms from Candidate(s) previously are able to push the said forms with the requisite detail(s) and/or Credential(s) and/or Identity (ies) into a specified SafeCase of a particular Candidate wherein the said Candidate is able to receive (pull) such SafeCase and add to his/her portfolio for further actions and/or future use in another SafeCase. This is not dependent on any technology and any existing or future technologies like ODBC or XML or JDBC or similar protocols and/or any current and/or future ETL methods (extract-transform-load) and/or the said Requestor may fill specified details as a regular data entry process on behalf of (Act-On-Behalf) of the Candidate, following which the said Candidate exercises further options and actions available to him/her Common Processes: Other than specific case based purposes, disclosed later, some of the common processes that run across the entire SafeCase process, which may be made available at requisite positions during the initiation to submission processes and which may be mandatory or optional and as per the choice of Candidate or Requestor, for any or each Credential or Identity used in the SafeCase or could use it globally for all constituents of the said SafeCase or SafeCase InstaCard are given below:

SafeCase Validity: the straight (fixed time bound) or cyclical (extensions possible past Validity) process through which the Candidate could define the Validity period of the said SafeCase for the said requestor to continue to access the said SafeCase once or more than once. Past the Validity, Requestors could request Candidates for extension of the same SafeCase. This process is different from the Access Period and Pickup Window processes and are shown next:

SafePrivacy Settings: During the course of finalizing the SafeCase for submission, the Candidate is privileged to define the Privacy Lock Settings for any or each Credential or Identity used in the SafeCase or could use it globally for all constituents of the said SafeCase or SafeCase InstaCard (SafeCase Insta Card disclosed later):

View Only, i.e. the Requestor can only view the data only provided by the Candidate Download Privilege, i.e. the Requestor can view data, view Credential(s) or Identity(ies) or also download them at a location of choice Access Conditions:

Access Period: i.e. the Period defined by the Candidate wherein the Requestor could access the said submission, post which the said SafeCase would expire and a new SafeCase submission needs to be initiated Access Rate: The Candidate is clearly able to define the frequency or the rate or the number of times that the said SafeCase or Credentials and/or Identity (ies) therein could be accessed by the Requestor Access Trigger: Candidates can select triggers, available as options if this is chosen, post which the said detail or Credential or Identity or SafeCase as a whole is either submitted or access is withdrawn or access is suspended or access is granted further to additional Requestors as a SafeChain Anonymization: The Candidate is able to self-anonymize by selecting this option. All identifying details and Credentials and Identities used by Candidates get obfuscated or through a cipher, unique to SafeCase attaching stealth characteristics. It needs to be pointed out that the anonymization process is of two types where in the first has a SafeCase System defined cipher and can be deciphered by SafeCase system while the second type has a user—defined cipher and is not decipherable by SafeCase System. Usage of anonymization is dependent on Requestors, while SafeCase allows usage across all its SafeCase Processes SafeWithdrawal Window: A simple process, through which the Candidate could define a 'Withdrawal hold' period and then submit the SafeCase. Once this 'Withdrawal hold' period lapses, the said SafeCase would automatically get submitted SafeSubmit Window: A simple process, through which the Candidate could define a 'Submission hold' period and then submit the SafeCase. Once this 'Submission hold' period lapses, the said SafeCase would automatically get withdrawn SafePickUp Window: A simple process, through which the Candidate could define a pickup period for the Requestor and then submit the SafeCase. Once the 'Pickup Window' period lapses, the said SafeCase would automatically get expired and Requestors would not be able to access the same and would need to request the Candidate again for a fresh initiation SafeLock Request: the process through which the Requestor could request the Candidate to approve the Credential Locking Request either on a permanent basis or for a defined time period, and once approved by the Candidate, the said Credential could still be used by the Candidate, but the approved lock and period be visible to each Requestor who had previously received such Credential or may receive it in future SafeUnlock Request: the process through which a Candidate could request a Requestor to release the 'Lock' on the Credential which was previously requested by the Requestor and approved by the Candidate SafeAttach Process: This process automatically attaches the required details or Credential (s) or Identity(ies) to the SafeCase initiated by the Candidate when a specific Requestor or a specific general category form or a specific form of a specific Requestor is chosen. Such pre-defined attachments (for the particular SafeCase) are bucketed as mandatory and/or optional and/or pending (due to non- availability of the same in the Portfolio). Candidate then decides on the subsequent actions such as Submit or Modify or Cancel the said SafeCase along with other associated processes as disclosed in this section SafeReturn Process: Once the said SafeCase is submitted, and the unique SafeCase ID generated, no changes are possible in the said submission except for in the Return SafeCase process wherein the Candidate can only append the submitted SafeCase with the details as demanded or requested by the Requestor but the Candidate cannot make any modifications in the SafeCase already submitted. The Candidate may, however, if needed, could create multiple SafeCases and submit multiple SafeCases to same or another one or multiple Requestor(s).

SafeCase Cloning Process: It is also important to note that one SafeCase can be submitted to only one Requestor. However, if, exactly the same SafeCase, that has been submitted to a Requestor needs to be submitted to another Requestor, the Candidate could use the Cloning process and take that as the Initiation point to submit the same as a new SafeCase which would automatically have a separate Unique SafeCase ID. The new SafeCase, thus submitted could be exactly similar or with some additions to an existing or already submitted SafeCase SafeCase InstaCard: In case of specific processes, wherever required, the Candidate could create a pre-defined SafeCase for routine submissions or specific purposes SafeCase, examples being given in ([74]). Candidates can create multiple SafeCase Cards and hold them to submit as and when needed by giving the Requestors the InstaCode SafeInstaCode Process: A simple process through which the Candidate, during creation of a SafeCase or SafeCase InstaCard, self-defines or chooses a system generated code (Alpha/Numeric/AlphaNumeric etc), that facilitates Requestors to pull the said SafeCase automatically, without any further actions or interventions from the Candidate. The said InstaCode is a two-part code. System generated InstaCode is non-uniform, unique during a defined period and till they are unused and both parts are managed by the system. Candidate generated InstaCodes have a defined first part to maintain uniqueness of InstaCodes (if multiple InstaCards are being created) while the second part could be kept uniform by the candidate during a defined period, till they are unused. Additionally Candidate could use a random second part or create a random second part SafePass: Certainly very different and innovative from routine passwords as we know them, this is a special process through which a Candidate defines the frequency and a passphrase (Alpha/Numeric/AlphaNumeric etc) which is self-defined or system generated to additionally secure the said SafeCase or SafeCase InstaCard against unauthorized access or forwarding. The Candidate is privileged to use the SafeCase Password for any or each Credential used in the SafeCase or could use it globally for all constituents of the said SafeCase or SafeCase InstaCard SafeDeclare: The declaration process made simple for the Candidates and Requestors alike, wherein the Requestors could clearly state the declarations they would be desirous to receive from Candidates and Candidates clearly understand the Declarations they are making or providing the Requestors. Such declarations may or may not be binding in nature and could purely be transactional SafeUpdate Request: The process through which the Requestor is able to request the SafeCase system to check for available updates in a single Credential and/or Identity or each Credential and/or Identity or the each/all SafeCase(s) received earlier. Once an update is identified by the SafeCase System, the Requestor is advised of the same and the Requestor seeks the Update from the Candidate for requisite updates to the same SafeCase, wherein each new/updated Credential and/or Identity is appended to the previously submitted SafeCase and the Candidate on its part simply needs to act on the said request by approving or declining or leave it as pending. The SafeUpdate Request is a time-bound process, the request or check done expiring after defined time period. The Candidate gets informed once the updates are received successfully by the Requestor SafeUpdate Auto: The process through which the Candidate, during the process of creation of a SafeCase, pre-approves the Requestor to request and automatically receive updates, if any to any or each of the Credential and/or Identity or the entire SafeCase. The SafeUpdate Auto is valid across a pre-defined time period which could also be set by Candidate. The Requestor on its part, requests the SafeCase system to check for updates and if allowed, through SafeUpdate Auto, is able to pull the required updates. The Candidate gets informed on the automatic actions for their records, once they are received by the Requestor SafeUpdate Issuer: The Issuer, who has actually issued the said Credential or Identity to the said Candidate has a limited, but critical role in SafeCase Process. In case the said Issuer, single source of truth for the Authentication (not Verification) of the said Credential(s) or Identity(ies) initiates an action, impacting the Credential or the purpose directly or indirectly, the SafeCase System generates an Alert automatically to the Requestors who have been provided the said Credential(s) or Identity(ies), such changes being (but not limited to) Revocation, Suspension, Deletion, Invalidation due to defined time limit (past expiry date or a change to the expiry date) and subsequent updating actions of Reinstatement or Reissuance or Validity Extension. The Issuer is also able to define if such changes could be pushed automatically to the Credential(s) and/or Identity(ies) using Requestors or the said Requestors need to request the said Candidates for approving the said updates or initiating new SafeCase Request afresh. In case the Issuer pushes the sad updates, the Candidate gets informed on such actions for their records, once they are received by the Requestor SafeFill Process: This process allows the Candidate to instruct the SafeCase system to automatically fill the specific form, which needs to be included in the new submission that has been created or has been returned from the Requestor requesting for additional information, with the information already available in the SafeCase or CertiSafe or such Trusted Identity systems. This process further allows the Candidate to update such information, overwriting the information automatically filled or adding the information previously not available. Further to this all such overwritten information is captured as additional information and missing information so filled is captured as available information for future usage. Necessary updates are then done to the Candidate's Portfolio. It may be pointed here that this may automatically trigger the SafeUpdate Processes as disclosed in ([67]) and ([68]). It is important also to point out that at no point of time, any detail ever gets deleted during the overwriting actions by the Candidate. Such additional details are added as additional details for the same information area. Candidate, however, has the privilege to use the SafeArchive Process SafeArchive: Any detail which is deemed as old and/or unusable and/or changed through actions undertaken by Candidate can be archived, which removes the said information or credential(s) or Identity(ies) from Candidate's portfolio. The Candidate is privileged to use the SafeArchive process in entirety for her/his account, wherein every detail, Credential or Identity ever fed into the system is archived (rendered unusable and non-referenceable, but never Deleted). This process can be used by the Candidate immediately upon registration ([35]) or before request for deletion of account or exercising privilege to be forgotten completely (XX). Any SafeCase submission that has been done successfully, but has not yet been accessed by the said Requestor gets withdrawn automatically, while the SafeCase system triggers alerts to all Requestors who had been provided the said information or credential(s) or Identity (ies), whether singularly or through any SafeCase submission. The Candidate also has the privilege of adding such information, if s/he so desires for future usage.

SafeDelete: The Candidate is able to request for deletion of her/his account on the basis of NOC (No Objections Certification) from each Requestor who has ever been provided a detail or a Credential or an Identity by the said User. The request for Deletion of Account executes a request for NOCs to all Requestors who can then either grant the same or keep it pending or even decline. The Candidate, from the time of Request for Deletion is able to only take referencing actions, but is then not able to use the Credential(s) or Identity(ies) from his/her portfolio or details in any manner, including requests for additional information from Requestors who have previously received a submission Portfolio Update: To create any SafeCase submission, the Candidate utilizes the available Credentials that have been authenticated by the said Issuer and the said Issuer alone, since the said Issuer is the only single source of truth. After gaining such Authenticated Credentials or utilizing the CSIDs generated from Identity systems like CertiSafe or other Trusted Identity Systems, each such Credential is available in the said Candidate's Portfolio. SafeCase is a smart system that automatically adds usage information to the Credentials and Identities of the said Candidate's portfolio as well. The SafeCase system also smartly adds the submitted SafeCase to the Candidate's Portfolio. This ensures that the said Candidate's Identity is perpetually updated with all the latest information and actions and is readily available for the Candidate to use or for reference Safe Cases: The mature, secure end-to-end application management system based on Trusted Identities as defined with varying degrees of Authenticity of Credentials (Self-certified to Identity Management System Based Authenticated Credentials or Issuer Based Authentication) that are submitted along with the said application by the applicant. For each SafeCase, system would allow none or any or all processes as mentioned across Common Processes ([45]). Candidates as well as Requestors stand to get benefitted immensely for routine or specific Submissions and/or declarations or a combination of both, such as KYC (Know Your Customer—Industry nonspecific) or AML or FACTA or other Regulatory form based declaration or periodic declarations or short resume or detailed resume or matrimonial card or succession will or portability of phone number (mobile or landline or others) or DND (Do Not Disturb Declarations) or Admissions or Employee Claims or Blood and/or Casting an opinion and/or choice or Organ Donor Card or Warranty Claims Insurance Claims or General Submission or DisasterSafe or SafeRx or similar processes (but certainly not limited to these only). Only some of them have been explained in the disclosures that follow since the processes are similar inherently:

SafeCase Basic: In the basic SafeCase, Candidates are enabled to submit their Credentials from their Portfolio as a single Credential or a bunch electronically to a recipient (Requestor)

SafeSubmit: In this process, Candidate is able to fill a form(s) within the SafeSubmit process and append the same with the available Credentials (if any). This is a general and multi-purpose process wherein such application form(s) filled by the Candidate are submitted to any Requestor SafeKYC: KYC (Know Your Customer—Industry non-specific) or AML or FACTA or other Regulatory form based declaration or periodic declarations. In this process, the applicant is able to generate multiple KYC cards by choosing Credential(s) from a defined set of KYC Credentials. Such KYC Card(s) are then submitted to Requestors under the defined Privacy Controls.

SafeResume: Automatic, pre-configured professional Resume/CV options made available to Candidate to effortlessly use the right details or Credentials or Identity. Candidate can certainly make modifications as desired and once completed submit the same to the Requestors SafeKnot: Automatic pre-configured personal or matrimonial resume through simple use of right details or Credentials or Identity which can be submitted to Requestors conveniently as required SafeSuccession: Succession litigations are commonplace with the initiator not available to defend the choices made and disclosed later and the risks associated with pre-mature disclosures of such choices, through a legal succession will, are known and prevalent as well. SafeSuccession SafeCase allows Candidates to submit the legal will as a detail or Credential to defined Requestors with the relevant privacy settings.

SafePort: Despite being a simple to execute procedure to port a number from one service provider to another, be it a bank account or communication numbers (mobile or phone or landline or fax etc) or insurance policies or similar services based on a number, these often regulated procedures, are executed simply by using this service through which the requisite form of initiation of such requests could be made by the Candidate to either service provider (current or post-porting) and on successful execution the details get updated for the candidate as done for all other SafeCase Processes SafeDND: Marketeers inadvertently or sometimes deliberately, create target groups of customers who are to be reached out to and often ignore the customer preferences. SafeDND SafeCase allows the Marketeers or Regulators Or Service Providers etc to safely fetch or receive the SafeDND from the Candidate and accordingly create or execute marketing campaigns SafeAdmit: In this process, in addition to processes defined under SafeSubmit and SafeHire, the Applicant or the Candidate is able to submit a set of Credentials to multiple Requestors (who may have requested for Requestor—specific forms to be submitted along with the defined Credential set). Additionally, a Requestor is able to request 'locking' of a particular Credential of the said applicant to prevent the applicant from submitting the same to another Requestor. The applicant thus has the choice between all Requestors who have accepted and requested to be allowed to 'lock' the credential(s). As and when the applicant accepts the 'lock' request, all other Requestors would be intimated or they would be in a position to know that the applicant has accepted the 'lock' request of a requestor other than them.

The said 'lock' could be a temporary, time bound, permanent electronic flag that states a particular condition.

SafeDonor Personal: Noble virtues or Personal choices to be a donor or to be a post-mortem organ donor is a simple SafeCase by selecting the right identities or credentials to support such previous actions or provide support post-mortem that is created by Candidates and referred by medical institutions SafeDonor Charities: Receiving or giving out charities is a simple SafeCase that uses or adds up to Identities that get used for such purposes other than monetary transactions. This SafeCase is intended to support the SafeKYC SafeCase in a convenient method for the Candidate and trusted by the Requestor(s)

SafeWarranty: Common issue of a product's coverage under warranty or entitlement to available services is easily resolved by the SafeWarranty SafeCase which is submitted by the Candidate (buyer) and received by the Warranty Service Provider and/or Seller DisasterSafe: Calling tree or reaching out exercises in the events of a drill or an actual disaster, time is most precious for assimilating the impact. A call center/helpdesk or similar teams could call or receive information through calls or automated calls or return calls or SMSs or automated e-mails instantly through DisasterSafe SafeCase process SafeCast: Opinions matter and define subsequent actions and execution, voicing an opinion is simplified through the SafeCast SafeCase process wherein a Candidate simply fills the requisite form with the requested details and/or Credentials and/or Identities as mandated by a Requestor or adds to the list of opinions by casting his/her vote. Remaining anonymous is possible through SafeCase SafeCase by Candidates through appropriate selection of Privacy Settings SafeClaim Insurance: In this process, the applicant is able to submit a statement of expenses for a particular purpose to a Requestor based on Authenticated Credentials and the Requestor can appropriately act on the same. The Requestor can then take the final step of acceptance or rejection. If intimating any other Requestor or Candidate or Issuer is defined in the process, the same shall get automatically executed. SafeClaim also includes the option of 'locking' of the Credential(s) permanently or temporarily depending on the discretion of Requestor to ensure one-time use of a particular detail and/or Credential and/or Identity SafeClaim Employee: In-house reimbursement claims of an employee towards petty expenses or travel are easily settled through SafeClaim SafeCase and gets executed in a manner similar to SafeClaim Insurance SafeCase SafeHire: In this process, in addition to SafeSubmit, the Candidate is provided an auto-Authenticated Credential by the said Requestor, which could be an Offer Letter or interview transcript or any other, once and only once the said Requestor issues any Credential in this regard. This new Credential that is auto—authenticated may be a positive outcome or a negative one or may simply be a simple communication of different types. Further, the Candidate may accept the Credential or choose to let the Credential pass its validity date. On acceptance, the Credential is added to Candidate's portfolio automatically. SafeHire SafeCase ends with the release of an Auto-Authenticated employee id (Requestor becomes the Auto-Issuer, but does not Authenticate as a Requestor since both Roles are clearly independent and delineated).

SafeRx: Purchasing medication online is riddled with risks and peril. The perpetual risk of anyone faking a prescription is not an exception, but a clear and present malice today. Candidates simply need to use the SafeRx SafeCase and provide the authenticated details and/or Credentials and/or Identities to an online or mail or proxy or any supplier and the latter gets significant assurance on the credibility as well. With Safe Rx SafeCase, medications which have not been prescribed by name or dosage or quantity or schedule or reasons etc would never get dispensed.

SafeChain: This is an option available to all SafeCases wherein the Candidate allows the Requestors to receive a conditional privilege to share the submitted SafeCase to additional Requestors that may be known or unknown to the Candidate. However, for each such sharing initiated by the first Requestor, second and subsequent Requestors need to seek Privacy Clearances from Candidate, who in turn uses his/her discretion for selection as per the Privacy Lock settings as disclosed in ([47]). It needs to be noted that First Requestor need not open the SafeCase and could easily delegate the same to second or many subsequent Requestors. The subsequent Requestors get the same privileges as the first Requestor. Further, All Requestors in a SafeChain and including the Candidate would be able to send the SafeCase back and forth as defined in the SafeReturn Process ([61]) with each constituent enabled to add any detail(s) or comments or notes to this particular SafeChain SafeCase.

The invention claimed is:

1. A computer-implemented method comprising:
    obtaining, by one or more processors, registrations from three users, wherein a first user comprises a candidate, a second user comprises a requestor, and a third user comprises an issuer, wherein the candidate comprises credentials for submission of a request, the requestor, who sets parameters for submission of the request, and an issuer, who authenticates the credentials based on the parameters;
    obtaining, by the one or more processors, from the requestor the parameters for the submission of the request;
    transmitting, the one or more processors, the parameters to the candidate;
    obtaining, based on the transmitting, a portion of the credentials, from the candidate, based on the parameters;
    providing, by the one or more processors, the portion of the credentials to the issuer;
    obtaining, by the one or more processors, from the issuer, an approval or a denial;
    based on obtaining an approval, configuring, by the one or more processors, an electronic briefcase for utilization by the candidate and the requestor, wherein the configuring comprises:
    issuing, by the one or more processors, a unique identifier and transmitting the unique identifier to the candidate and to the requestor, wherein the candidate can access the electronic briefcase based on the unique identifier until submission to the requestor, wherein the accessing comprises modifying or appending contents of the electronic briefcase and setting an access period of the electronic briefcase; and
    securing, by the one or more processors, the electronic briefcase for access exclusively by the requestor for a duration consisting of the access period, based on the submission by the candidate;
    based on obtaining a denial, notifying the requestor that the electronic briefcase has not been configured;
    obtaining, from the issuer, a change in authentication status of the candidate; and
    based on the change, initiating an action selected from the group consisting of: suspending access to the electronic briefcase, revoking access to the electronic briefcase, and reinstating access to the electronic briefcase.

2. The computer-implemented method according to claim 1, wherein the credentials comprise an Identity.

3. The computer-implemented method according to claim 1, wherein, obtaining the portion of the credentials comprises obtaining the portion as a single credential or as a bunch.

4. The computer-implemented method according to claim 1, wherein obtaining the portion of the credentials comprises providing a graphical user interface with a form, wherein the candidate submits the portion of the credentials via the form or as an attachment to the form.

5. The computer-implemented method according to claim 1, wherein the portion of the credentials comprise a resume.

6. The computer-implemented method according to claim 1, wherein the portion of the credentials comprises a legal will.

7. The computer-implemented method according to claim 1, further comprising:
    providing, by the one or more processors, a select portion of the credentials designated by the candidate to Marketeers or Regulators via a fetch command.

8. The computer-implemented method according to claim 1, based on obtaining the unique identifier from the candidate, enabling the candidate to store organ donor preferences in the electronic briefcase.

9. The computer-implemented method according to claim 1, based on obtaining the unique identifier from the candidate, enabling the candidate to store warranty information in the electronic briefcase.

10. The computer-implemented method according to claim 1, based on obtaining the unique identifier from the candidate, enabling the candidate to submit a statement of expenses for a particular purpose to the Requestor.

11. The computer-implemented method according to claim 1, wherein the parameters comprise an Offer Letter or interview transcript.

12. The computer-implemented method according to claim 1, further comprising:
    based on obtaining an approval and subsequent to the securing, providing the requestor with a conditional privilege to share access to the electronic briefcase with the Candidate.

* * * * *